United States Patent
Wong et al.

(10) Patent No.: US 11,089,653 B2
(45) Date of Patent: Aug. 10, 2021

(54) SPLIT WIRELESS NETWORKS AND MANAGEMENT OF SAME TO PROVIDE DATA AND VOICE SERVICES

(71) Applicant: Charter Communications Operating, LLC, St. Louis, MO (US)

(72) Inventors: Curt C. Wong, Bellevue, WA (US); Maulik V. Vaidya, Denver, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 310 days.

(21) Appl. No.: 16/380,793

(22) Filed: Apr. 10, 2019

(65) Prior Publication Data

US 2019/0274188 A1 Sep. 5, 2019

Related U.S. Application Data

(62) Division of application No. 15/711,761, filed on Sep. 21, 2017, now Pat. No. 10,375,761.

(51) Int. Cl.
| | |
|---|---|
| *H04W 88/06* | (2009.01) |
| *H04W 36/14* | (2009.01) |
| *H04W 92/02* | (2009.01) |
| *H04W 68/12* | (2009.01) |
| *H04W 36/00* | (2009.01) |
| *H04W 99/00* | (2009.01) |

(52) U.S. Cl.
CPC ....... *H04W 88/06* (2013.01); *H04W 36/0022* (2013.01); *H04W 36/14* (2013.01); *H04W 68/12* (2013.01); *H04W 92/02* (2013.01); *H04W 99/00* (2013.01)

(58) Field of Classification Search
CPC ..... H04W 36/14; H04W 68/12; H04W 88/06; H04W 92/02; H04W 99/00; H04W 36/0022
See application file for complete search history.

(56) References Cited

U.S. PATENT DOCUMENTS

| | | | |
|---|---|---|---|
| 2012/0172011 A1 | 7/2012 | Sudhendra et al. | |
| 2012/0258707 A1* | 10/2012 | Mathias | H04W 76/18 455/426.1 |
| 2015/0230070 A1 | 8/2015 | Kadiyala et al. | |
| 2017/0070877 A1 | 3/2017 | Shi et al. | |

(Continued)

*Primary Examiner* — Timothy X Pham
(74) *Attorney, Agent, or Firm* — Armis IP Law, LLC

(57) ABSTRACT

According to one configuration, a mobile communication device receives first communications over a first wireless communication link from a first wireless network (which potentially supports data only communications). The first communications received over the first wireless network can include a message indicating a pending incoming call available over a second wireless network (which potentially supports voice/call communications). In response to receiving the message indicating the pending incoming call, the mobile communication device is operated to receive second communications (such as a paging signal) from over the second wireless network. For example, the mobile communication device listens for a paging signal from the second wireless network further indicating the pending incoming call. If desired, an operator of the mobile communication device can accept the incoming call via a second wireless communication link to the second wireless network.

21 Claims, 11 Drawing Sheets

(56) References Cited

U.S. PATENT DOCUMENTS

| | | |
|---|---|---|
| 2017/0094628 A1 | 3/2017 | Miao et al. |
| 2017/0127217 A1 | 5/2017 | Miao et al. |
| 2017/0208603 A1 | 7/2017 | Goel et al. |
| 2018/0013888 A1* | 1/2018 | Zhao .................... H04M 3/436 |

* cited by examiner

SPLIT WIRELESS NETWORKS AND MANAGEMENT OF SAME TO PROVIDE DATA AND VOICE SERVICES

RELATED APPLICATIONS

This application is a divisional application of earlier filed U.S. patent application Ser. No. 15/711,761 entitled "SPLIT WIRELESS NETWORKS AND MANAGEMENT OF SAME TO PROVIDE DATA AND VOICE SERVICES," filed on Sep. 21, 2017, the entire teachings of which are incorporated herein by this reference.

BACKGROUND

Conventional LTE (Long Term Evolution) cellular networks typically include a core network, a RAN (Radio Access Network), and one or more mobile communication devices (UE or user equipment).

The radio access network (RAN) resides between user equipment (UE) such as a mobile phone, a computer, or any remotely controlled machine and provides connection with its core network (CN). As its name suggests, the radio access network provides respective user equipment access (such as Internet access) via the core network.

In certain instances, conventional LTE networks offer both voice and data services to user equipment via a single subscription such as a single SIM (Subscriber Identification Module). As well known, a subscriber identity module (SIM) is an integrated circuit that securely stores information such as the International Mobile Subscriber Identity (IMSI) number and its related key, which are used to identify and authenticate subscribers on mobile telephony devices (such as mobile phones and computers). It is also possible to store contact information on many SIM cards.

A new-shared spectrum scheme is being introduced in the United States at 3.5 GHz called CBRS (Citizens Broadband Radio Service). This new band can be used to support LTE communications.

BRIEF DESCRIPTION OF EMBODIMENTS

There are deficiencies associated with conventional LTE cellular networks (e.g., 3G, 4G, 5G) and use of a single SIM to support data or voice services or a dual SIM that supports use of only one SIM at a time. For example, certain networks and/or frequency bands may support only data services. This means that an alternative network would be needed to support voice services. This creates a scenario where a user will also need to carry a separate device for voice calls. The need to carry two devices is cumbersome and unappealing to the consumer.

This disclosure includes the observation that being limited to use of only a single network at a time means that a user may not receive notification of an incoming phone call because they are currently using data services, preventing notification of a pending incoming call alert on a secondary network.

Embodiments herein provide novel techniques to provide ease of switching between use of multiple wireless networks such wireless data networks and wireless voice networks.

More specifically, in one embodiment, a mobile communication device has wireless access via a first wireless network (such as an LTE wireless network supporting data delivery) and a second wireless network (such as an LTE wireless network supporting voice communications).

Assume that the mobile communication device is initially operated in a first mode in which the mobile communication device receives first communications over a first wireless communication link from the first wireless network (supporting a first carrier frequency or a first carrier frequency band). At least a portion of the first communications received over the first communication link are data communications directed to an application executed on the mobile communication device. Using the received data communications. In one embodiment, the application uses the received data communications to display images (such as in a graphical user interface) on a display screen of the mobile communication device.

As previously discussed, the remote communication device also supports communication with the second wireless network over a second carrier frequency or second carrier frequency band. Rather than repeatedly switchover to a second carrier frequency band or carrier frequency to monitor communications over the second wireless network to detect pending incoming voice call alerts received on the second carrier frequency, embodiments herein include notifying the mobile communication device of a respective incoming voice call via communications over the first wireless communication link from the first wireless network. Thus, a respective user of the mobile communication device can operate the mobile communication device in the first mode supporting data communications and be notified (as a message in the data communications) of a respective incoming call even though the call cannot be answered using the (data only) services provided by the first wireless network.

Because the first wireless network does not support voice communications, to accept the incoming voice call, and in response to receiving the call notification via communications from the first wireless network, the mobile communication device switches over to monitoring and receiving communications from the second wireless network. In one embodiment, the second wireless network transmits (over the second carrier frequency or second carrier frequency band) a paging signal to the mobile communication device over a second wireless communication link. The mobile communication device receives the paging signal and accepts the incoming call to establish a call connection via the second wireless network.

Accordingly, in one embodiment, the communication device detects a call alert message in the first communications over the first wireless network; the call alert message indicates a pending attempt by a remote communication device to communicate with the mobile communication device. In response to receiving the message, if desired by a user, the mobile communication device is operated to receive second communications from the second wireless network to establish the call connection.

Thus, the user of the mobile communication device can be notified of a respective incoming call over a first wireless network that is not able to service the respective incoming call. However, the notification of the incoming call enables the mobile communication device to switch over to the second wireless network to further receive notice and acceptance of the incoming call. Via a call connection, the mobile communication device then communicates (voice communications from the user of the mobile communication device) over the second wireless communication link and second wireless network to the remote communication device. In a reverse direction, using the second carrier frequency, the mobile communication device receives voice communications over the call connection from a user operating the remote communication device.

Subsequent to termination of the inbound voice call from the remote communication device (or outbound call from the mobile communication device to the remote communication device), the mobile communication device switches back to communicating with the first wireless network to retrieve data for an application executed on the mobile communication device. State information associated with the original communications over the first wireless network (before the inbound or outbound call) can be saved such that the user is able to reuse the application where they left off prior to the call.

In one embodiment, the mobile communication device and corresponding user are assigned a dual SIM (Subscriber Identity Module) including a first subscriber identity module and a second subscriber identity module, the first subscriber identity module providing the mobile communication device access over the first wireless network, the second subscriber identity module providing the mobile communication device access over the second wireless network.

Alternatively, a single SIM is assigned to the mobile communication device and corresponding user, enabling use of the first wireless network. The first wireless network and the second wireless network may have a roaming relationship. In such an instance, the user is assigned use of the single SIM to use the first wireless network but is able to use the single SIM to also use the second wireless network as part of a service agreement.

Accordingly, user equipment such as a mobile communication device is not required to listen to voice paging from a voice-handling network over a second carrier frequency band in order to receive a notification of a pending incoming call (mobile terminating call) on the second carrier frequency band.

As previously discussed, embodiments herein are useful because a respective mobile communication device can use a first wireless service over a first wireless network and easily switch over to use of a second wireless service over a second wireless network on an as needed basis. These and other more specific additional embodiments are disclosed herein as further discussed below.

Note that any of the resources as discussed herein can include one or more computerized devices, mobile communication devices, servers, base stations, wireless communication equipment, communication management systems, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate control of a device. The instructions, when executed by computer processor hardware, cause the computer processor hardware (such as one or more co-located or disparately processor devices) to: receive first communications at the mobile communication device over a first wireless communication link from the first wireless network; detect a message in the first communications, the message indicating a pending attempt by a remote communication device to communicate with the mobile communication device; and in response to receiving the message, operate the mobile communication device to receive second communications from the second wireless network to establish a call connection with the remote communication device over the second wireless network.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of supporting different wireless services. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
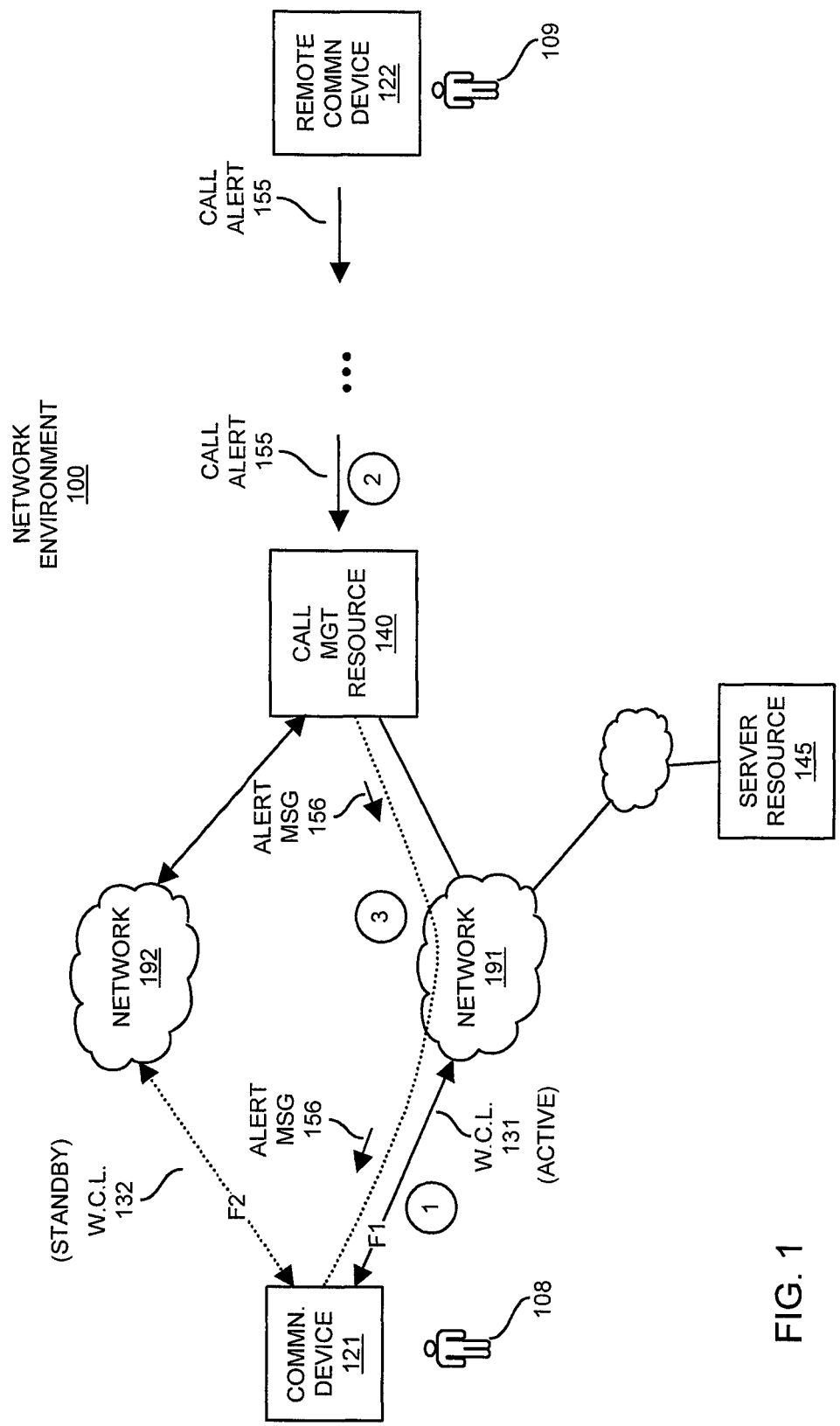
FIG. 1 is an example diagram illustrating notification of an incoming call to a mobile communication device over a first wireless network according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a mobile communication device receives first communications over a first wireless communication link from a first wireless network (such as a network dedicated to support non-voice data communications). Among the data communications, the first communications include a message indicating a pending incoming call that can be accepted over a second wireless network.

In response to receiving the message indicating the pending incoming call, the mobile communication device is operated to communicate with the second wireless network to receive second communications. For example, in one embodiment, in response to receiving the notification of the incoming call via communications received over the first wireless network at a first carrier frequency, the mobile communication device listens for a paging signal (transmitted at a second carrier frequency over the second wireless network) indicating the pending incoming call. If desired, an operator of the mobile communication device accepts the incoming call via one or more communications over a second wireless communication link established between the mobile communication device and the second wireless network.

In one configuration, the mobile communication device is assigned a dual SIM (Subscriber Identity Module)—one SIM to support data communications over the first wireless network and one SIM to support voice communications over the second wireless network.

Alternatively, the mobile communication device is assigned a single SIM for use of one of two wireless networks; the mobile communication device and corresponding communication device have roaming privileges to use the other wireless network.

As further discussed below, certain embodiments herein ensure that voice communications to a mobile communication device are always carried via one LTE (wireless) network while data only communications and corresponding sessions are carried via a second LTE (wireless) network.

Now, more specifically, FIG. 1 is an example diagram illustrating notification of an incoming call to a mobile communication device over a first wireless network according to embodiments herein.

As shown, network environment 100 includes communication device 121 (including corresponding hardware and software), network 191, network 192, call management resource 140 (including corresponding hardware and software), and remote communication device 122 (including corresponding hardware and software).

User 108 operates the communication device 121. User 109 operates the remote communication device 122.

Wireless network 191 can be any suitable type of network supporting wireless communications. In one embodiment, wireless network 191 is an LTE network supporting LTE data (non-voice call) communications. The wireless network 191 potentially operates in a frequency spectrum or band such as the CBRS band (CFB1 or Carrier Frequency Band #1).

Wireless network 192 can be any suitable type of network supporting wireless communications. In one embodiment, wireless network 192 is an LTE network supporting LTE voice/call communications. The wireless network 191 potentially operates in a second carrier frequency band (CFB2).

Communication device 121 communicates with either or both of wireless networks 191 and 192.

Note that the communication device 121 may not be able to switch from one frequency (in CFB1) to another frequency (in CFB2) in time if a respective paging occasion (PO, as defined in 3GPP TS 36.304) is too short. This means that the mobile communication device 121 may not receive a voice-paging request from network 192 while the communication device 121 is camped on network 191 as a primary network.

Figure 6:
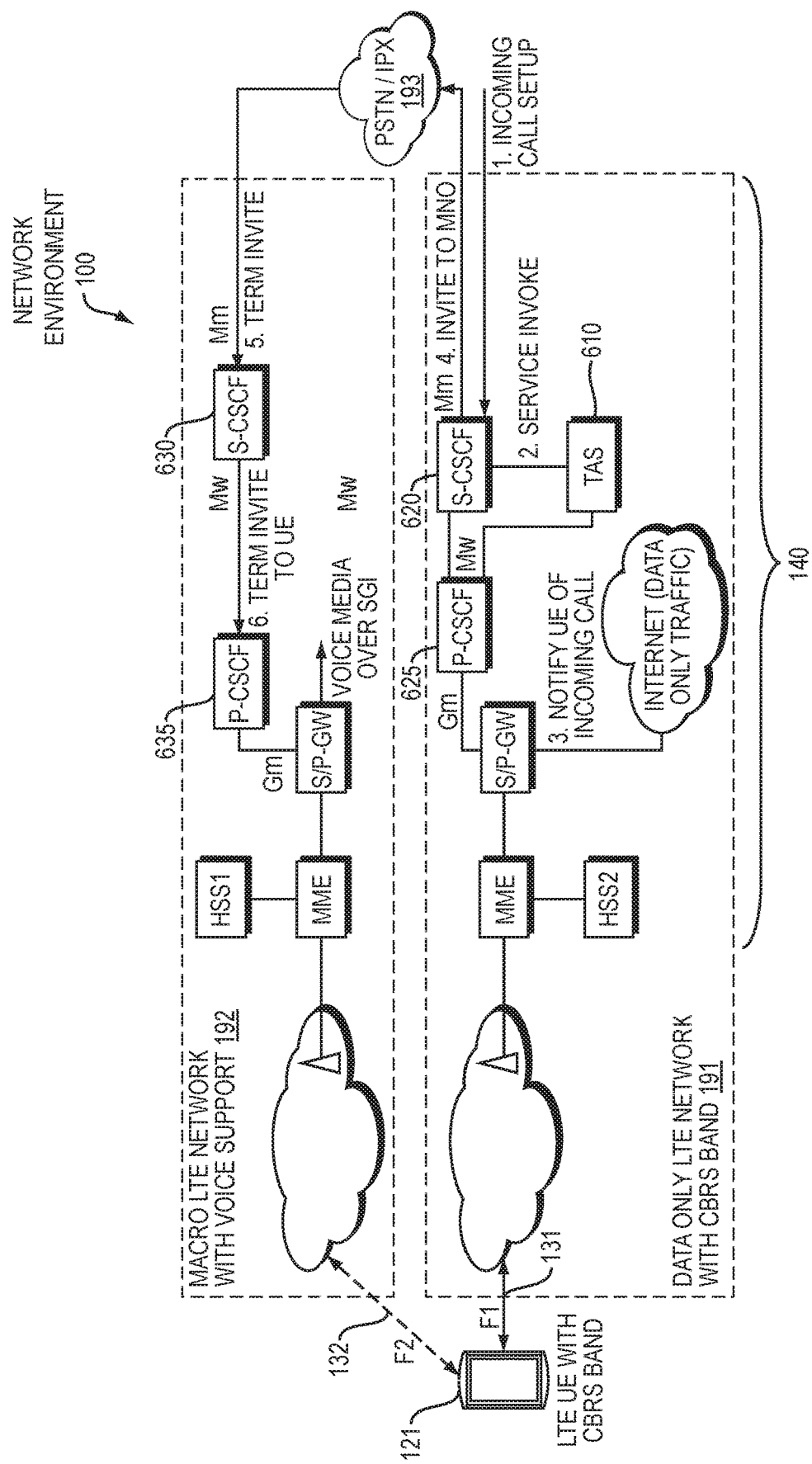
FIG. 6 is an example diagram illustrating multiple wireless networks, each of which supports different types of communications according to embodiments herein.

One embodiment herein supports the following preconditions:
1. The communication device 121 may be assigned a dual-SIM with single receiver software/hardware to monitor radio communications; mobile communication device 121 can be configured to have 2 separate LTE stacks or at least simultaneously maintain 2 different LTE/EPS contexts (one for each of wireless network 191 and 192).
2. Macro/F2 (wireless network 192) and CBRS/F1 (wireless network 191) may or may not have a restricted roaming partnership.
3. Communication device 121 is LTE attached to both wireless networks 191 and 192.
4. Communication device 121 is IMS (IP Multimedia Subsystem) registered. One example (such as further illustrated in FIG. 4) shows that the mobile communication device 121 is IMS registered with an IMS operated by the CBRS/F1. Another example (FIG. 6)

shows that mobile communication device 121 is IMS registered with both wireless networks i.e., mobile communication device 121 is potentially assigned two different MSISDNs (one for each of the wireless networks 191 and wireless network 192): MSISDN2 for Macro/F2 (wireless network 192) and MSISDN1 for CBRS/F1.

5. Communication device 121 is pre-configured with the identity of the primary PLMN (Public Land Mobile Network). In this example, assume that the primary PLMN is CBRS/F1 network (wireless network 191).

6. Communication device 121 is aware which radio access network supports VoLTE (Voice LTE) based on the network given indication such as 3GPP defined "MS voice over PS Session Supported Indication" in TS 23.401. In such an example embodiment, CBRS/F1 network (wireless network 191) does not support VoLTE communications while Macro/F2 (wireless network 192) does support VoLTE communications. Hence, the mobile communication device 121 will use Macro/F2 LTE network (wireless network 192) for voice/call/phone related services.

As previously discussed, embodiments herein include a novel call management resource 140 (hardware and corresponding executed software) to facilitate better use of both wireless networks.

Assume in this example embodiment that the communication device 121 establishes a wireless communication link 131 (and corresponding communication session such as based on LTE or other suitable protocol) with the wireless network 191. The communication device 121 also establishes a wireless communication link 132 (and corresponding communication session (such as based on LTE or other suitable protocol) with the wireless network 192.

When the wireless communication link 131 is active (able to convey data), the application executing on the communication device 121 initiates retrieval of data from a remote resource such as server resource 145 in network environment 100. In one embodiment, the application executing on communication device 121 (computer device) uses the data retrieved over the wireless communication link 131 for any suitable purpose such as to display corresponding images on a display screen of the communication device 121 to the user 108. The application executing on the communication device 121 may be a browser retrieving webpages and corresponding data over the wireless network 191.

Assume further in this example embodiment that, while the user 108 has an active communication session over wireless communication link 131 with network 191, the remote communication device 122 generates a respective call alert 155, attempting to establish a call connection with the remote communication device 121.

In such an instance, network environment 100 forwards the call alert 155 (communication) to the call management resource 140 (hardware and corresponding executed software). Because the communication device 121 currently operates in a data only mode over wireless network 191 and does not diligently monitor communications over wireless communication link 132, the communication device 121 is not able to detect the incoming call from the remote communication device 122 via communications over the wireless communication link 132. Embodiments herein alleviate such an issue because the call management resource 140 forwards a respective alert message 156 over wireless network 191 to the communication device 121, which is currently used by the communication device 121 to retrieve data communications. The alert message 156 over wireless communication link 131 ensures that the communication device 121 will receive the notification of the incoming call as indicated by the call alert 155.

Figure 2:
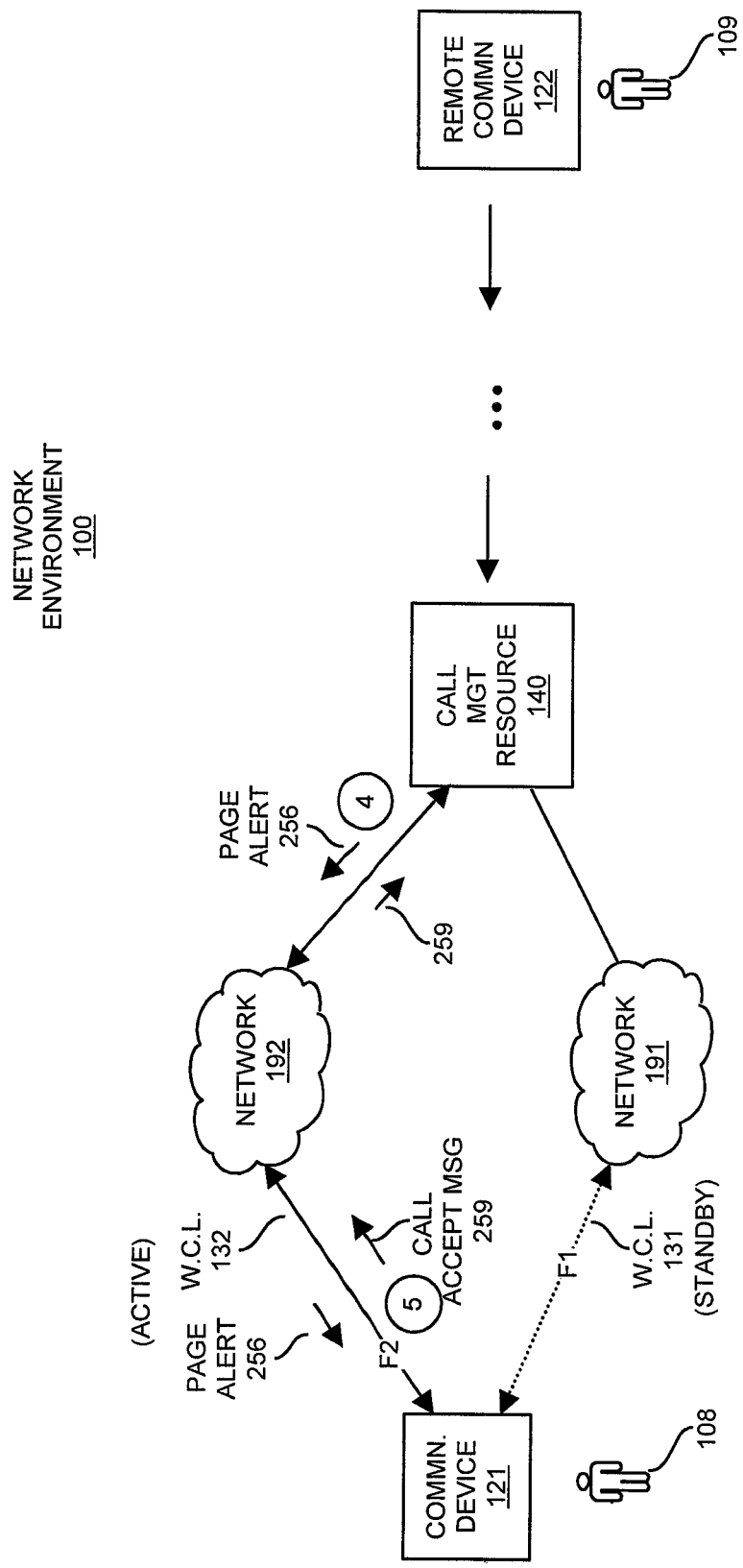
FIG. 2 is an example diagram illustrating use of a second wireless network to accept the incoming call over a second wireless network according to embodiments herein.

In response to receiving the call alert message 156 over wireless communication link 131 (in which the call alert message 156 is potentially intermixed and received at the mobile communication device 121 along with data communications from server resource 145), the communication device 121 performs further processing as discussed in FIG. 2.

FIG. 2 is an example diagram illustrating use of a second wireless network to accept the incoming call over a second wireless network according to embodiments herein.

In response to receiving the alert message 156, which indicates that there is a pending incoming call (and paging) to the communication device 121, the communication device 121 switches over to monitoring communications transmitted over wireless communication link 132 to the communication device 121.

As shown in FIG. 2, in addition to providing the alert message 156 to the communication device 121, the call management resource 140 transmits a respective page alert 256 over wireless network 192 to the communication device 121. Page alert 256 indicates the pending call to the communication device 121. Accordingly, because the communication device 121 was previously notified to monitor the wireless communication link 132 via the alert message 156, the communication device 121 receives the page alert 256. The page alert 256 indicates that the user 109 operating remote communication device 122 is attempting to establish a respective voice call connection with the communication device 121 over the wireless network 192 (which supports the voice calls/communications).

In response to receiving page alert 256, the communication device 121 generates a notification (such as an audio signal, visual image on a display screen, etc.) to notify the respective user 108 of the incoming call.

Assume further in this example embodiment that the user 108 decides to accept the incoming call from the remote communication device 122. In such an instance, the communication device 121 transmits a call accept message 259 over the wireless communication link 132 and network 192 to the call management resource 140. Via further call setup processing, the network environment 100 (and potentially call management resource 140) establishes a respective call connection between the communication device 121 and the remote communication device 122 over at least wireless communication link 132 and network 192 as shown in FIG. 3.

Figure 3:
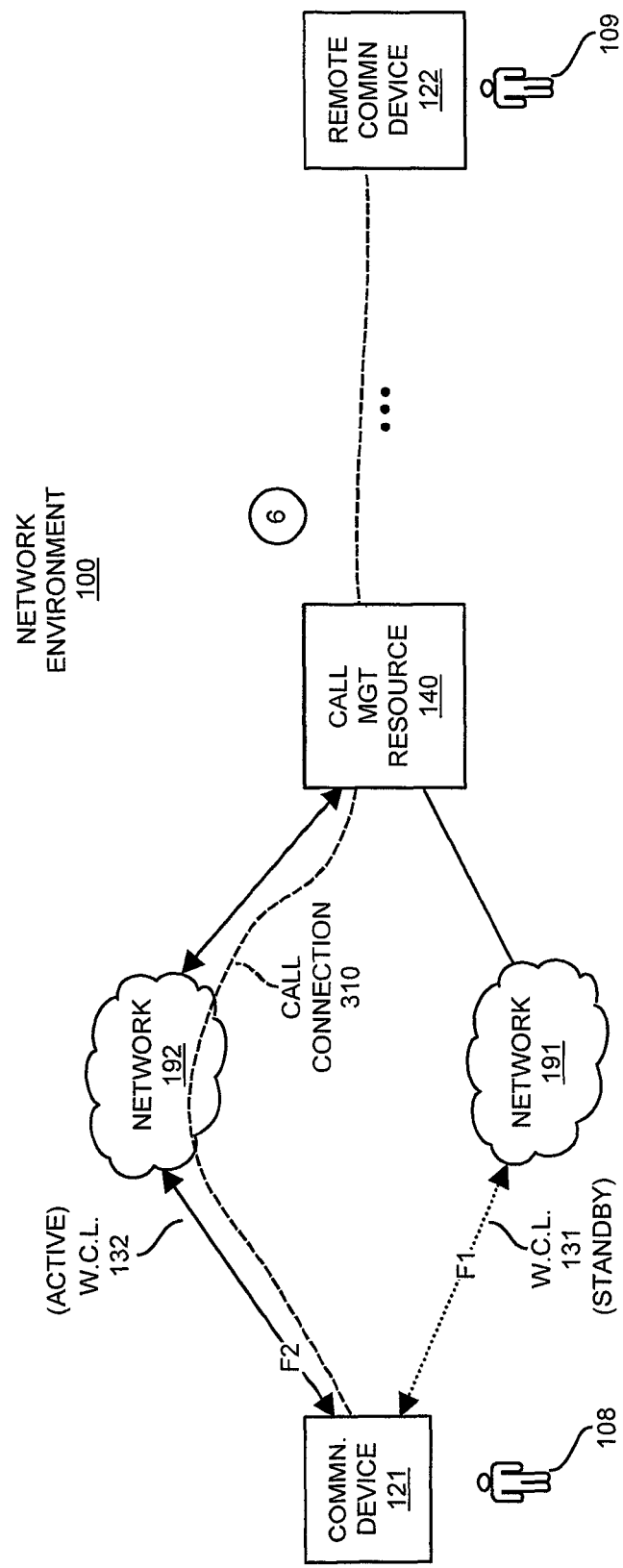
FIG. 3 is an example diagram illustrating a call connection between a mobile communication device and a remote communication device over a second wireless network according to embodiments herein.

During the call connection 310, in which the wireless communication link 132 is operated in the active mode as shown in FIG. 3, the wireless communication link 131 is at least temporarily set to a standby mode. Call connection 310 supports two-way communications between the communication device 121 and the remote communication device 122.

In this manner, the wireless network 191 supports (non-voice, non-call, etc.) data communications while wireless network 192 supports voice communications. The notification (such as alert message 156) over the network 191 alleviates the communication device 121 from having to repeatedly switch between use of the first carrier frequency F1 (or first carrier frequency band) and the carrier frequency F2 (or second carrier frequency band) in order to avoid missing a respective incoming call. Instead, the additional communications over the wireless network 191 to the communication device 121 indicate the incoming call and potential need to switchover.

In summary, embodiments herein can include:

1. UE (communication device 121) always tries to use the preferred wireless network 191 for data services. The user 108 signs up with a service provider providing access to the wireless network 191. Assume in this example embodiment that the wireless network 191 is the preferred PLMN (Public Land Mobile Network).

2. As long as the communication device 121 is within the preferred PLMN coverage provided by network 191, the mobile communication device 121 uses a respective data services in that PLMN (wireless network 191).

3. In case of MO (Mobile Originated) call: If the preferred PLMN (wireless network 191) does not support VoLTE type of communications services, the communication device 121 switches over to the voice supported PLMN (in this case Macro/F2) to perform the MO voice call. In other words, if the user 108 operating the communication device 121 decides to send an outbound call request message to the remote communication device 122, the communication device 121 uses the wireless communication link 132 and corresponding network 192 to provide a call attempt notification and establish the respective call connection with the remote communication device 122.

4. In case of a MT (Mobile Terminating or inbound call) call: as previously discussed, MT calls always get terminating treatment by IMS in the preferred PLMN (in this case CBRS/F1, wireless network 191), and are made to an MSISDN1 that is assigned by the preferred PLMN. The IMS in the preferred PLMN sends an indication to the target communication device that the terminating call session (call alert) is pending.

5. If the communication device 121 is currently camping in a non-voice supporting PLMN (CBRS/F1, such as wireless network 191) and receives notification of incoming call from remote communication device 122, the communication device 121 switches over to voice services supported by PLMN (macro/F2, wireless network 192) to receive the voice call.

6. If both PLMNs (CBRS/F1 and Macro/F2) can support voice, the preferred PLMN, based on UE reachability in preferred PLMN, either:
   a. pages the UE (mobile communication device 121) in the preferred PLMN (wireless network 191) OR
   b. pages the UE in preferred PLMN (wireless network 191) and uses MSISDN2 (assigned by the Macro (F2) PLMN) to send an SIP INVITE to Macro PLMN (F2), causing the UE (communication device 121) to be paged over network 192 (Macro PLMN/F2).

7. If the preferred PLMN (CBRS/F1 in this case, wireless network 191) does not support voice, the preferred PLMN (wireless network 191) forwards the call using MSISDN2 (assigned by the Macro/F2 PLMN) and causes the communication device 121 to be paged in Macro/F2 PLMN (wireless network 192).

8. When the communication device 121 terminates the voice session over the wireless network 192, the communication device 121 switches back to use of data only network (CBRS/F1, wireless network 191).

To further expand on these principles, the following (FIG. 4 below) shows how IMS with EPS (Evolved Packet System) is used. In this case, it is assumed that the Marco/F2 (wireless network 192) and CBRS/F1 network (wireless network 191) have an IMS roaming relationship, and that the IMS subscription belongs to a preferred PLMN (i.e, MSISDN is assigned by IMS in the preferred PLMN-CBRS/F1).

Figure 4:
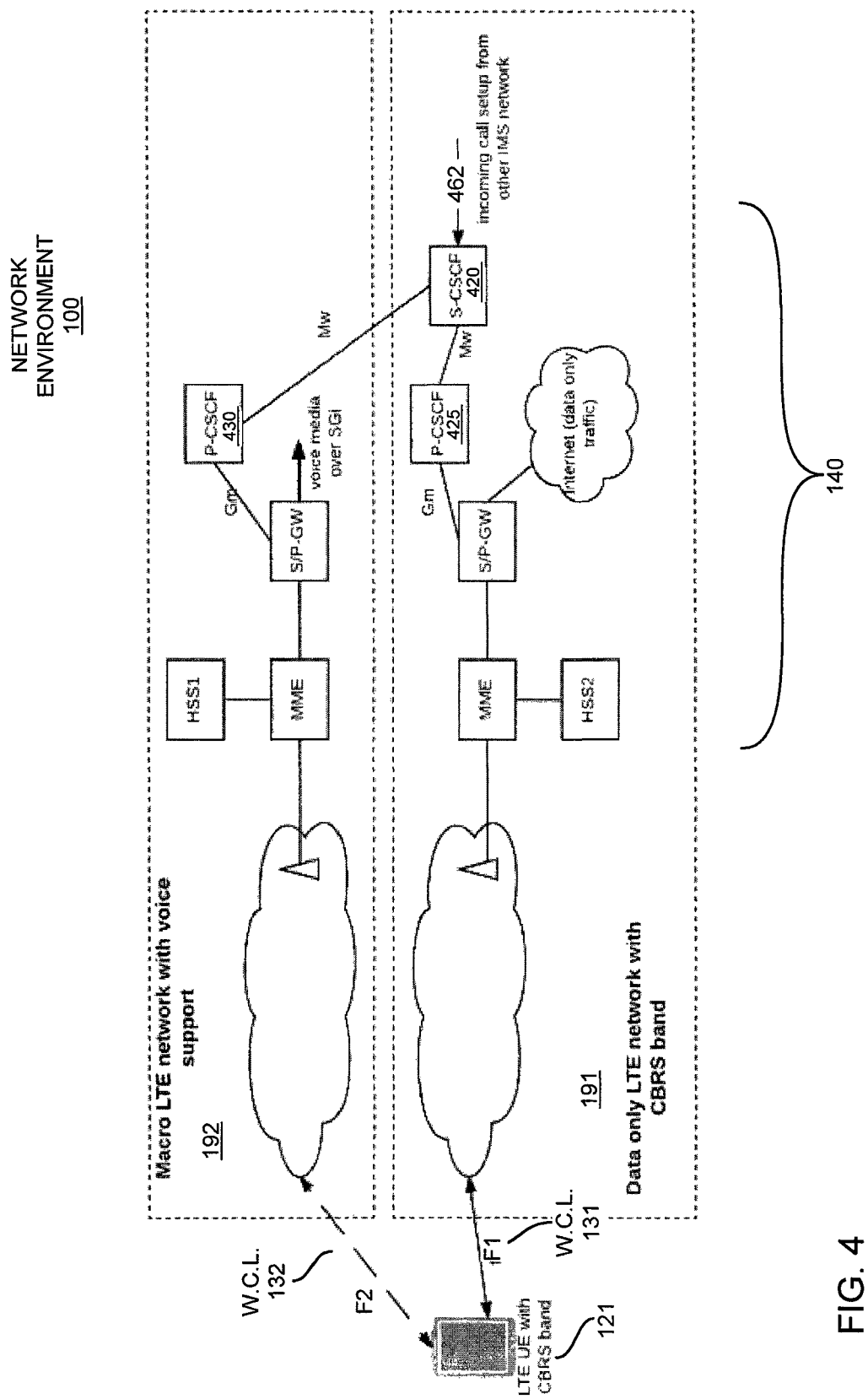
FIG. 4 is an example diagram illustrating multiple wireless networks that each support a different type of communication according to embodiments herein.

FIG. 4 is an example diagram illustrating a network setup using IMS/EPS with IMS roaming agreement between those networks according to embodiments herein.

In this example, assume that the mobile communication device 121 is assigned dual subscriptions and is attached to both networks 191 and 192. In one embodiment, this is achieved with a dual SIM assigned to the mobile communication device 121. A first SIM supports use of the wireless network 191; the second SIM supports use of wireless network 192.

Alternatively, as previously discussed, the communication device 121 is assigned a single SIM that is associated with macro LTE network (wireless network 192) while using other network credentials (e.g., certificate or user-name/password based authentication) to use wireless network 191 such as a CBRS based data only LTE network.

Initially, the mobile communication device 121 performs IMS registration using the IP address assigned from each network. This means the communication device 121 has dual IMS registrations with the networks 191, 192 to the same IMS in the preferred PLMN.

Assume further that the communication device 121 connects to and stays on wireless network 191 as its primary network. In one embodiment, the communication device 121 is aware that wireless network 191 does not support VoLTE communications because the mobile communication device 121 has not received the voice-supported indication from network 191. The mobile communication device 121 is aware that wireless network 192 (MacroLTE/F2) supports voice communications due to receiving a voice supported indication from wireless network 192 or other suitable resource.

When the wireless network 191 and corresponding (S-CSCF 420) receives an incoming INVITE 462 (i.e., due to the MSISDN1 being assigned by this preferred PLMN), the S-CSCF 420 sends a terminating call indication to the communication device 121. This call terminating indication can be based on SIP signaling or over the top signaling. The communication device 121 switches from using wireless network 191 to use of wireless network 192.

Since the preferred PLMN (wireless network 191) does not support VoLTE, the IMS continues the SIP terminating procedure toward the IMS registration binding from the Macro/F2's P-CSCF 430.

The communication device 121 receives notification of INVITE from Macro/F2. Then the communication device 121 continues the terminating voice session setup procedure using IMS. The following FIG. 5 further illustrates the above example.

Figure 5:
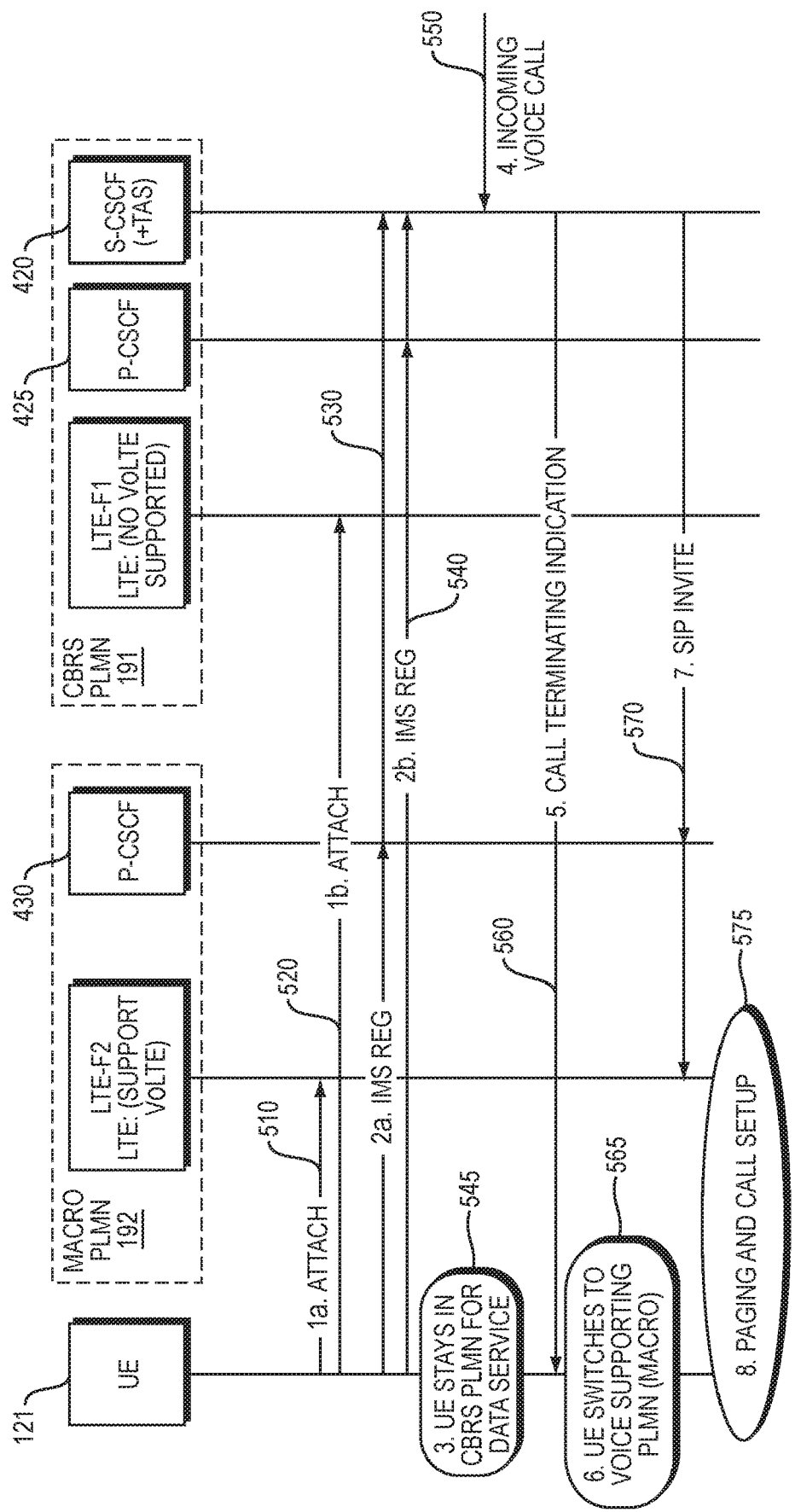
FIG. 5 is an example diagram illustrating notification of an incoming call to a respective mobile communication device over a first wireless network and switch over of a mobile communication device to use of the second wireless network to accept an incoming call according to embodiments herein.

FIG. 5 is an example diagram illustrating notification of an incoming call to a respective mobile communication device over a first wireless network and switch over of the mobile communication device to the second wireless network to accept an incoming call according to embodiments herein.

In this example embodiment, the wireless networks 191, 192 support IMS roaming between each other.

Via communications 510, the communication device 121 attaches (establishes a communications session) to the wireless network 192. Via communications 520, the communication device 121 attaches (establishes a communications session) to wireless network 191.

Via further communications 530 between the communication device 121 and the P-CSCF 430, the communication device 121 registers itself with wireless network 192. As shown, the P-CSCF 430 provides further notification of the registration to the S-CSCF at 420 associated with wireless network 191.

Via communications 540 between the communication device 121 and the P-CSCF 425, the communication device 121 registers itself with wireless network 191. The P-CSCF 425 provides further notification of the registration to the S-CSCF 420 associated with wireless network 191.

As further shown, during processing 545 by communication device 121, the communication device 121 uses wireless communication link 131 to retrieve data over wireless network 191.

Via communications 550, the S-CSC at 420 receives notification of an incoming voice call from the remote communication device 122. In response to receiving this notification, the S-CSCF 420 transmits communications 560 to the communication device 121 over wireless communication link 131. In one embodiment, communications 560 notifies the communication device 121 to switch over to monitoring the wireless communication link 132.

In response to receiving the communications 560 indicating a pending incoming call from the remote communication device 122, the communication device 121 switches over to processing 565, during which the communication device 121 monitors communications from wireless network 192 over the previously established wireless communication link 132.

As further shown, via communications 570, the S-CSCF 420 notifies the P-CSCF 430 of the pending incoming call from the remote communication device 122. As a response to receiving the communication 570, the wireless network 192 transmits a respective paging signal over wireless communication link 132 to the communication device 121. Recall that the communication device 121 switches over to monitoring the wireless communication link 132. In response to receiving the paging signal over wireless communication link 132, the communication device 121 notifies the respective user 108 of the incoming call via an audio signal, visual signal, etc.

Via at least a portion of processing 575, if the communication device 121 receives input from the respective user 108 accepting the incoming call, the mobile communication device 121 communicates with the wireless network 192 to setup the call connection 310.

FIG. 6 is an example diagram illustrating a network setup using IMS/EPS without IMS roaming agreement between wireless networks according to embodiments herein.

The network configuration as shown in FIG. 6 assumes that the wireless network 192 (such as Macro/F2 LTE) and wireless network 191 (such as CBRS/LTE/F1) have no IMS roaming relationship. In this case, the UE (such as a mobile communication device 121) has two IMS subscriptions, one for each of wireless networks 191 and 192.

In this configuration, the mobile terminating session is handled as follow:

In operation #1 (such as incoming call set up), the IMS (such as S-CSCF 620) of the wireless network 191 (CBRS/F1) receives notification of the incoming call.

In operation #2 (such as service invoke), the TAS 610 of wireless network 191 is invoked via the ISC interface. The TAS 610 executes the call forwarding service using the MSISDN2 assigned by the wireless network 191 as the destination address.

In operation #3 (such as notify UE of incoming call), the TAS 610 also sends an indication to the mobile communication device 121 via the wireless communication link 131 that a voice call is pending. The indication can be sent in any suitable manner. In one embodiment, the indication is sent using SIP Notify or over the top application/signaling.

In operation #4 (invite to MNO), due to call forwarding service, the IMS (S-CSCF 620) in the data network (wireless network 191) sends the call notification (INVITE) to the PSTN/IPX network 193.

In operation #5 (such as term invite), the IMS (S-CSCF 630) of the wireless network 192 receives notification of the incoming call (INVITE).

In operation #6 (such as term invite to UE), the notification of the incoming call from the remote communication device 122 is sent from S-CSCF 620) to the mobile communication device 121 using normal IMS procedure via network 192.

In this example embodiment, when the communication device 121 receives the indication from non-VoLTE supported network 191 (CBRS/F1) in operation #3, the communication device 121 switches over to the VoLTE supported network (wireless network 192) and monitors for the LTE paging associated with the incoming call. The communication device 121 then continues with the normal IMS setup procedure at the wireless network 192 to establish a respective call connection 310 (as in FIG. 3). Further details are discussed in FIG. 7.

Figure 7:
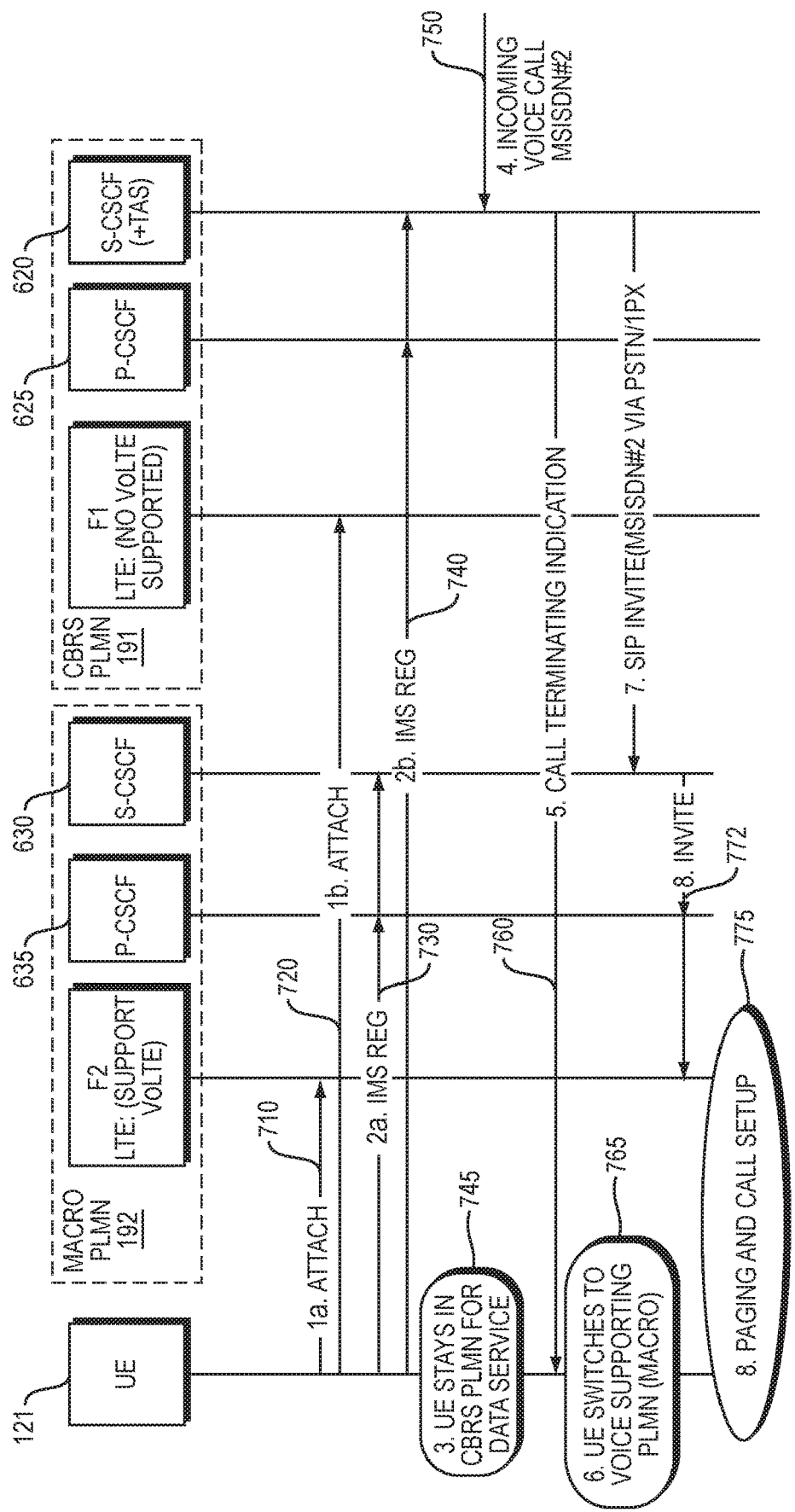
FIG. 7 is an example diagram illustrating notification of an incoming call to a respective communication device over a first wireless network and switch over of the mobile communication device to the second wireless network to accept the incoming call according to embodiments herein.

FIG. 7 is an example diagram illustrating notification of an incoming call to a respective communication device over a first wireless network and switchover of the mobile communication device to the second wireless network to accept the incoming call according to embodiments herein.

The embodiments in FIG. 7 illustrate terminating call flow continuation from the wireless network 191 (such as a CBRS network) to wireless network 192 (Macro). In this example embodiment, note that there is no IMS roaming between both wireless networks.

Another example described below is for the case that both PLMN support VoLTE. In this case, the preferred PLMN, based on UE reachability in preferred PLMN, either:
a. pages the UE in the preferred PLMN using existing IMS procedure with LTE, OR
b. pages the UE in preferred PLMN and uses MSISDN2 (assigned for use in wireless network 192 by the Macro/F2 PLMN), sends a SIP INVITE to Macro/F2 causing the UE to be paged in Macro PLMN (F2).

Via communications 710 in FIG. 7, the communication device 121 attaches (establishes wireless communication link 131) to the wireless network 192. Via communications 720, the communication device 121 attaches (establishes wireless communication link 132) to wireless network 191.

Via further communications 730 between the communication device 121 and the P-CSCF 635, the communication device 121 registers itself with wireless network 192. The P-CSCF 635 provides further notification of the registration to the S-CSCF at 630 associated with wireless network 192.

Via communications 740 between the communication device 121 and the P-CSCF 625, the communication device 121 registers itself with wireless network 191. The P-CSCF 625 provides further notification of the registration to the S-CSCF 620 associated with wireless network 191.

During processing 745 by communication device 121, the communication device 121 uses wireless communication link 131 (and respective data services) to retrieve data over wireless network 191.

Via communications 750, the S-CSCF 620 receives notification of an incoming voice call from the remote communication device 122. In response to receiving this notification, the S-CSCF 630 transmits communications 760 to the communication device 121 over wireless communication link 131. Communications 760 notify the communication device 121 to switch over to monitoring the wireless communication link 132 for communications from wireless network 192.

In response to receiving the communications 760 indicating a pending incoming call from the mobile communication device, the communication device 121 switches over to processing 765, during which the communication device 121 monitors communications from wireless network 192 over wireless communication link 132.

As further shown, via communications 770, the S-CSCF 620 notifies the S-CSCF 630 of the pending incoming call from the remote communication device 122.

As a response to receiving the communication 770, the S-CSCF 630 associated with wireless network 192 transmits communications 772 (including INVITE) to the P-CSCF 635 associated with the wireless network 192.

P-CSCF 635 of wireless network 191 initiates communication of a respective paging signal over wireless communication link 132 to the communication device 121. In response to receiving the paging signal (processing 775), the communication device 121 notifies the respective user 108 of the incoming call via an audio signal, visual signal, etc.

Via further processing 775 by the communication device 121, if the communication device 121 receives input from the respective user 108 accepting the incoming call, the mobile communication device 121 communicates with the wireless network 192 to setup the call connection 310.

Figure 8:
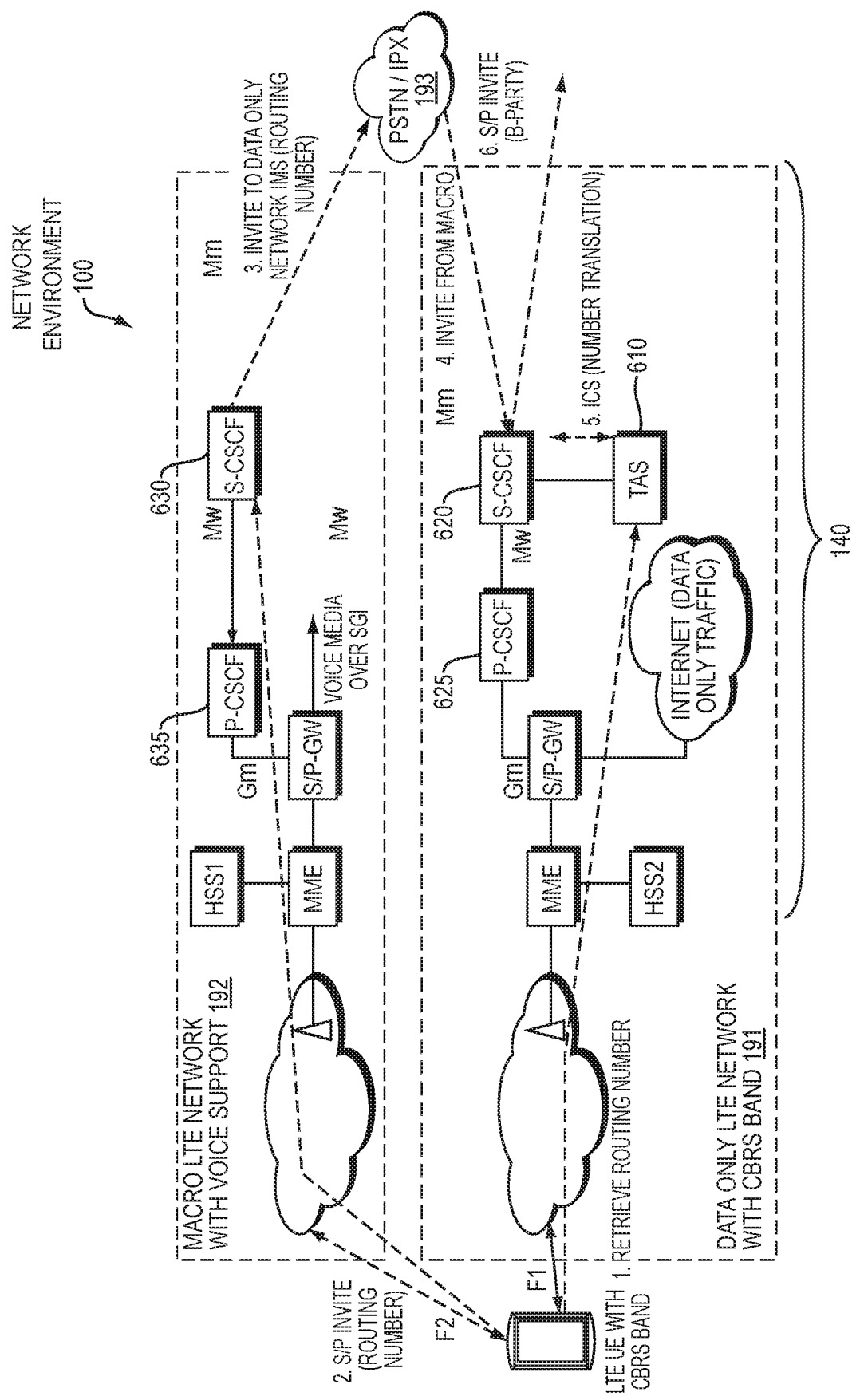
FIG. 8 is an example diagram illustrating handling of caller ID information according to embodiments herein.

FIG. 8 is an example diagram illustrating handling of caller ID information according to embodiments herein.

The example embodiment in following FIG. 8 shows how to handle a Mobile Originating call. This enables the IMS of the wireless network 191 (such as a CBRS/F1 network) to ensure the caller ID of the calling party (communication device 121) is shown appropriately to the called party (b-party).

In one embodiment, handling of the caller ID by the wireless network 191 (CBRS/F1 network) is as follows:

In operation #1 (such as retrieve routing number), the mobile communication device 121 indicates to the server (TAS 610) of the destination b-party number (remote communication device 122). TAS 610 responds with a routing number that is used to route the call back to this IMS (CBRS/F1). This can be achieved using over the top signaling between mobile communication device 121 and TAS 610. Note: the signaling exchange can be done over any IP network (i.e., it to does not necessarily have to be over wireless network 191.

In operation #2 (such as SIP INVITE with routing number), the mobile communication device 121 switches over to use of the wireless network 192 and initiates a call toward the routing number received from operation #1.

In operations #3 (such as INVITE to data only network IMS routing number) and operation #4 (such as INVITE from MACRO), the notification of the call is routed to the IMS of the wireless network 191 (CBRS/F1 network).

In operation #5 (such as ISC number translation), the TAS 610 is used to convert the routing number into the actual B-party number from operation #1. TAS 610 (acting as B2BUA), initiates an SIP INVITE with the correct calling party ID showing the calling party identity (i.e, MSISDN1) toward the B-party (remote communication device 122).

Operation #6 (such as SIP INVITE to b-party) illustrates continuation of the call flow (and transmission of the SIP INVITE) from the S-CSCF 620 in wireless network 191 toward the B-party (remote communication device 122) using the IMS procedure.

Figure 9:
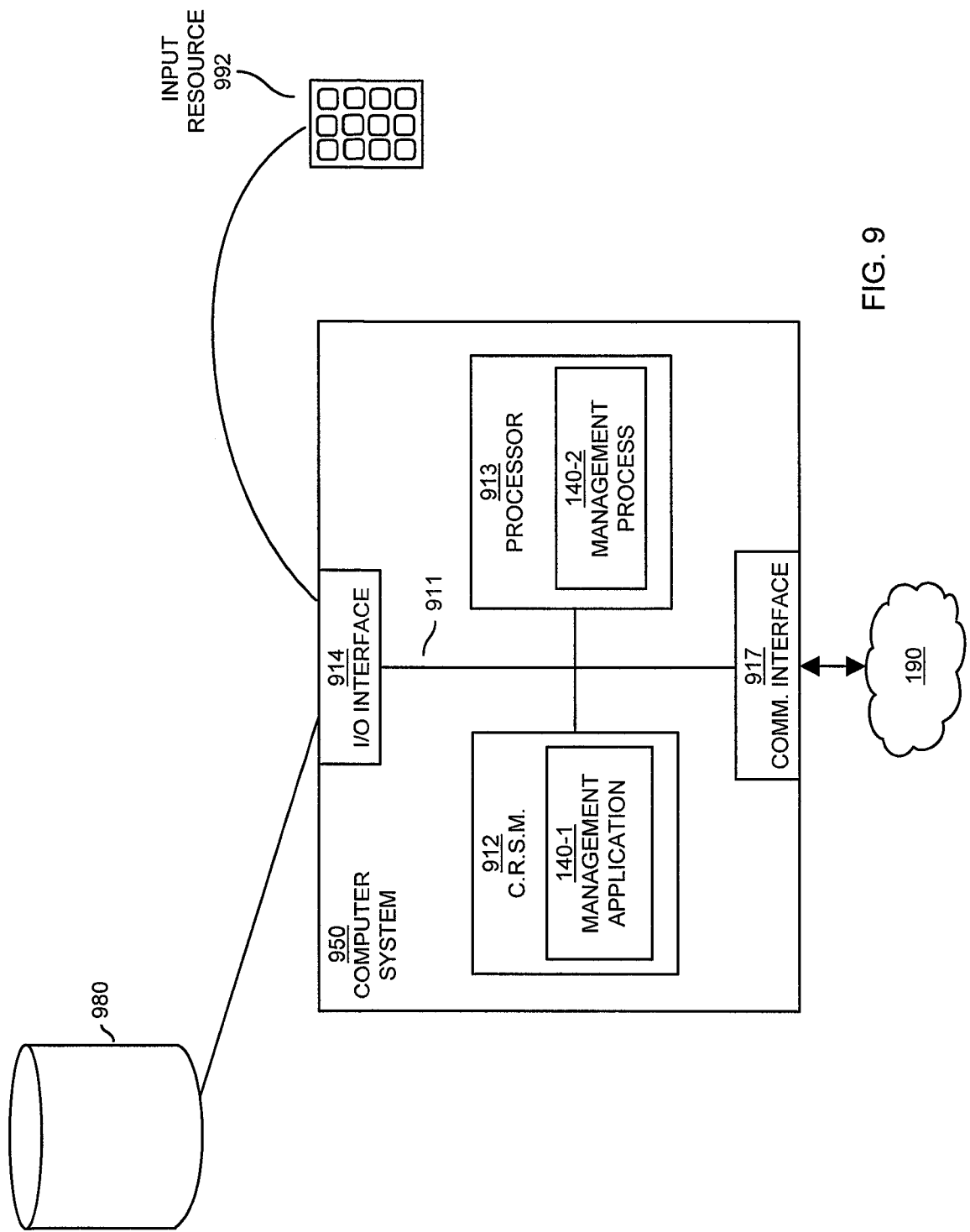
FIG. 9 is a diagram illustrating an example computer architecture to execute one or more operations according to embodiments herein.

FIG. 9 is an example block diagram of a computer system for implementing any of the operations as discussed herein according to embodiments herein.

Any of the resources (such as communication device 121, remote communication device 122, communication management resource 140, wireless network 191, wireless network 192, etc.) as discussed herein can be configured to include computer processor hardware and corresponding executable instructions to carry out the different operations as discussed herein.

As shown, computer system 950 of the present example can include an interconnect 911 that couples computer readable storage media 912 such as a non-transitory type of media (i.e., any type of hardware storage medium) in which digital information can be stored and retrieved, a processor 913, I/O interface 914, and a communications interface 917.

I/O interface 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in communication management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to communication management application 140-1.

In accordance with different embodiments, note that computer system may be or included in any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote communication device, any type of computing or electronic device, etc. The computer system 950 may reside at any location or can be included in any suitable resource in any network environment to implement functionality as discussed herein.

Functionality supported by the different resources will now be discussed via flowcharts in FIGS. 10 and 11. Note that the steps in the flowcharts below can be executed in any suitable order.

Figure 10:
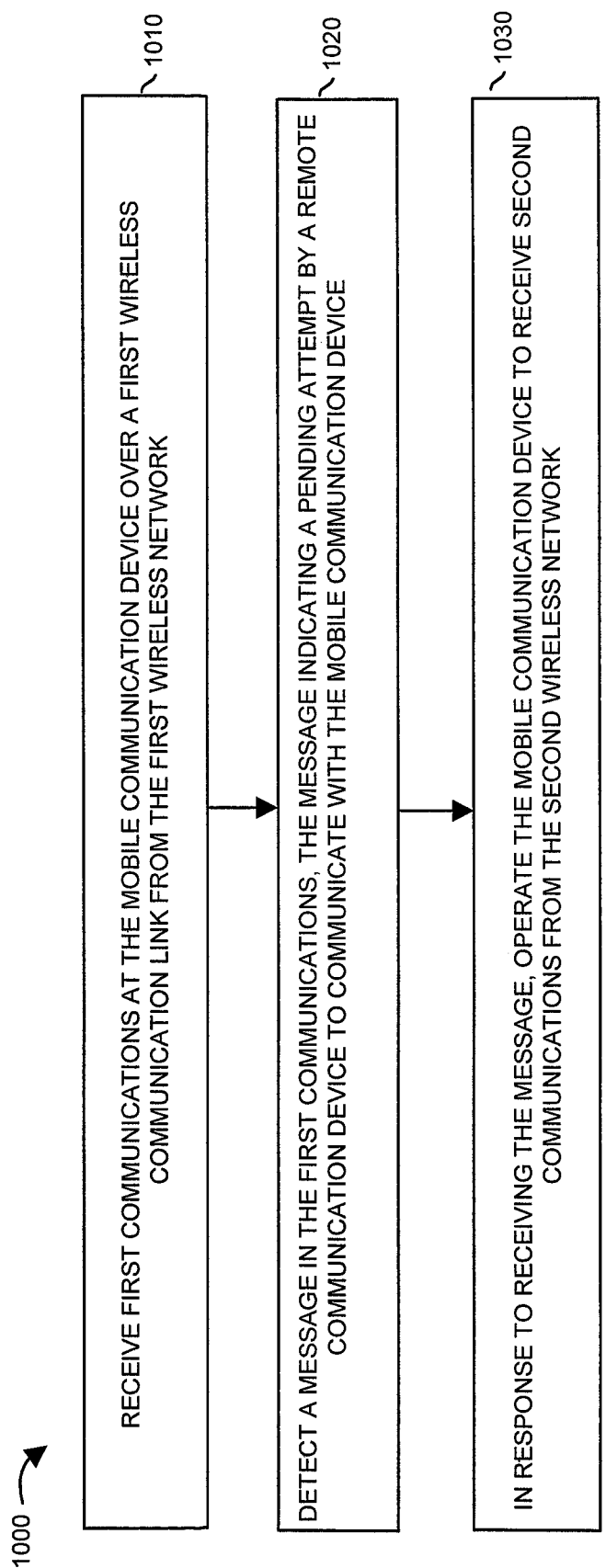
FIGS. 10 and 11 are an example diagrams illustrating methods according to embodiments herein.

FIG. 10 is a flowchart 1000 illustrating an example method according to embodiments. Note that there will be some overlap with respect to concepts as discussed above.

In processing operation 1010, the mobile communication device 121 receives first communications (such as data communications) over a first wireless communication link 131 from the first wireless network 191.

In processing operation 1020, the mobile communication device 121 detects a call alert message 156 in the received first communications from the wireless network 191. The call alert message 156 indicates a pending attempt by remote communication device 122 to communicate with the mobile communication device 121.

In processing operation 1030, in response to receiving the message 156, the mobile communication device 121 switches over to use of wireless network 192 and corresponding wireless communication link 132 to receive (second) communications from the second wireless network 192. In one embodiment, the switchover includes monitoring wireless network 192 for communications such as page alert 256, voice communications, etc.

Figure 11:
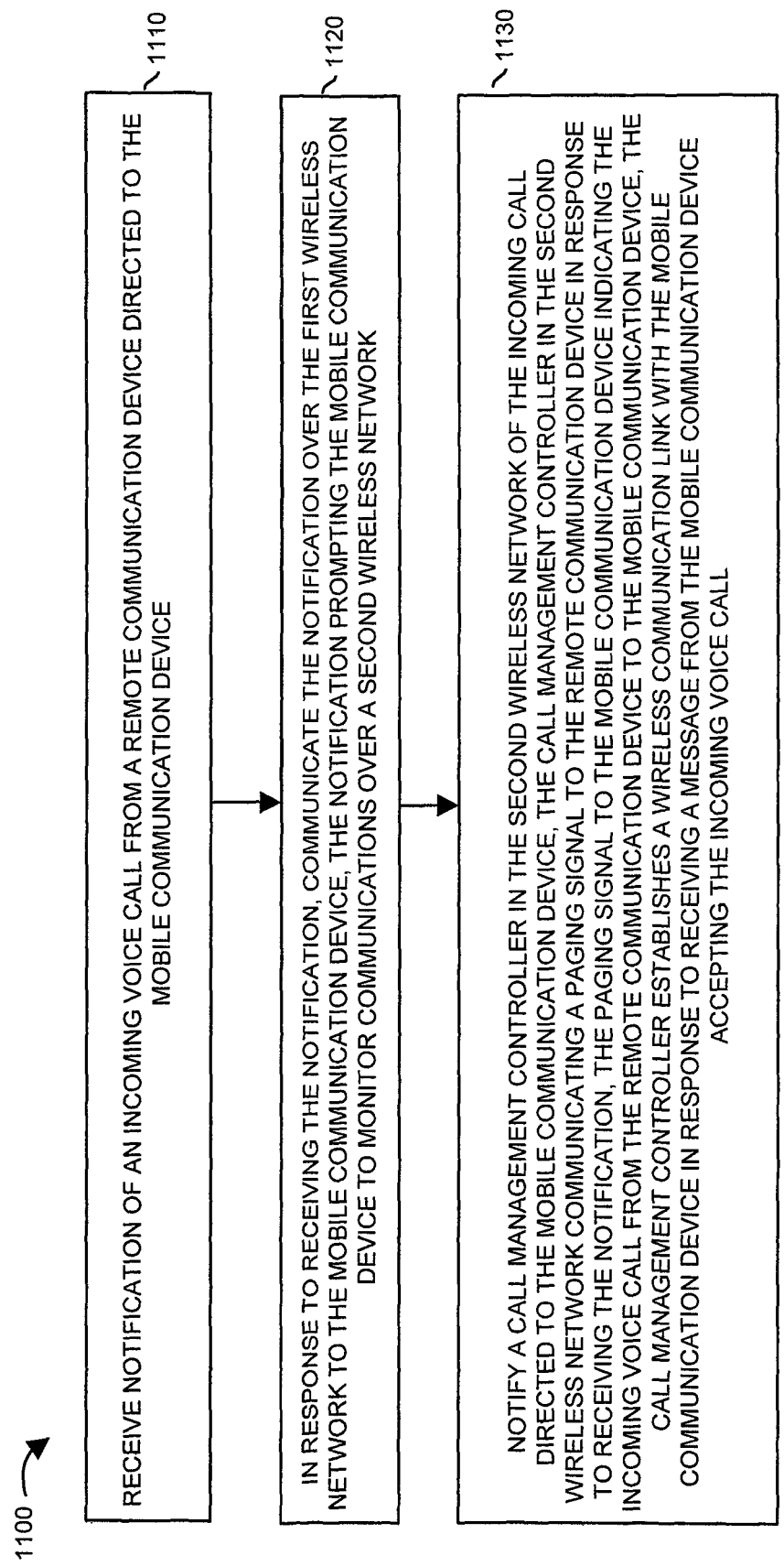

FIG. 11 is a flowchart 1100 illustrating an example method according to embodiments. Note that there will be some overlap with respect to concepts as discussed above.

In processing operation 1110, a call management resource 140 (such as a portion in first wireless network 191) receives notification of an incoming voice call (such as via call alert 155) from a remote communication device 122. The incoming voice call is directed to the mobile communication device 121.

In processing operation 1120, in response to receiving the notification, the call management resource 140 communicates the notification (such as a message 156 indicating the call alert 155) over the first wireless network 191 to the communication device 121. The notification (message 156 indicating the call alert 155) prompts the mobile communication device 121 to monitor communications transmitted to the mobile communication device 121 over the second wireless network 192.

In processing operation 1130, a call management resource in the wireless network 191 notifies a call management resource in the second wireless network of the incoming call directed to the mobile communication device 121. The call management resource in the second wireless network communicates a paging signal to the mobile communication device 121 in response to receiving the notification. The paging signal to the mobile communication device 121 indicates the incoming voice call from the remote communication device 122. The call management resource in the second wireless network establishes a wireless communication link with the mobile communication device 121 in response to receiving a message from the mobile communication device 121 accepting the incoming voice call.

Note again that techniques herein are well suited to provide voice paging notifications and voice session handling in the context of using two different networks such as a first wireless network supporting voice communications and a second wireless network supporting data communications. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining," or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
   receiving notification of an incoming voice call from a remote communication device directed to a mobile communication device;
   in response to receiving the notification, communicating a message over a first wireless network to the mobile communication device, the message prompting the mobile communication device to monitor communications over a second wireless network; and
   notifying a call management controller in the second wireless network of the incoming voice call directed to the mobile communication device.

2. The method as in claim 1 further comprising:
   communicating a paging signal from the call management controller in the second wireless network to the remote communication device in response to the notification, the paging signal to the mobile communication device indicating the incoming voice call from the remote communication device to the mobile communication device.

3. The method as in claim 2 further comprising:
   establishing a wireless communication link with the mobile communication device in response to receiving a message from the mobile communication device accepting the incoming voice call, the wireless communication link established over the second wireless network.

4. The method as in claim 1 further comprising:
communicating the message over a first wireless communication link established in the first wireless network; and
establishing a second wireless communication link in the second wireless network between the call management controller in the second wireless network and the mobile communication device.

5. The method as in claim 1 further comprising:
receiving a communication at the call management controller in the second wireless network, the communication received from the mobile communication device over a wireless communication link between the mobile communication device and the second wireless network, the communication accepting the incoming voice call directed to the mobile communication device.

6. The method as in claim 1 further comprising:
communicating an incoming call alert from the call management controller in the second wireless network over the second wireless network to the mobile communication device, the incoming call alert indicating the incoming voice call.

7. The method as in claim 1, wherein the message is a call notification intermixed amongst other data communications directed to the mobile communication device from the first wireless network, the data communications used to control a display screen of the mobile communication device, the call notification indicating the incoming voice call directed to the mobile communication device.

8. The method as in claim 1, wherein the mobile communication device is camped on the first wireless network when the mobile communication device receives the message over the first wireless network.

9. The method as in claim 1, wherein no wireless communication link is established between the mobile communication device and the second wireless network at a time of the mobile communication device receiving the message over the first wireless network.

10. The method as in claim 1, wherein the mobile communication device is operable to camp on the first wireless network after terminating a wireless communication link in the second wireless network supporting the incoming voice call.

11. A system comprising:
a call management controller allocated in a first wireless network, the call management controller implemented to handle voice call communications on behalf of a mobile communication device, the call management controller operable to:
receive notification of an incoming voice call from a remote communication device directed to the mobile communication device;
in response to receiving the notification, communicate a message over the first wireless network to the mobile communication device, the message prompting the mobile communication device to monitor communications over a second wireless network; and
notify a call management controller in the second wireless network of the incoming call directed to the mobile communication device.

12. The system as in claim 11, wherein the call management controller in the second wireless network is operable to communicate a paging signal to the remote communication device in response to the notification, the paging signal to the mobile communication device indicating the incoming voice call from the remote communication device to the mobile communication device.

13. The system as in claim 12, wherein the call management controller in the second wireless network is operable to establish a wireless communication link with the mobile communication device in response to receiving a message from the mobile communication device accepting the incoming voice call.

14. The system as in claim 11, wherein the call management controller in the second wireless network is operable to:
communicate the message prompting the mobile communication device to monitor communications over a first wireless communication link established in the first wireless network; and
establish a second wireless communication link in the second wireless network with the mobile communication device.

15. The system as in claim 11, wherein the call management controller in the second wireless network is operable to:
receive a communication from the mobile communication device over a wireless communication link between the mobile communication device and the second wireless network, the communication accepting the incoming voice call directed to the mobile communication device.

16. The system as in claim 11, wherein the call management controller in the second wireless network is operable to:
communicate notification of an incoming call alert over the second wireless network to the mobile communication device, the incoming call alert indicating the incoming voice call.

17. The system as in claim 11, wherein the message is a call alert intermixed amongst other data communications directed to the mobile communication device from the first wireless network, the data communications used to control a display screen of the mobile communication device, the call alert indicating the incoming voice call directed to the mobile communication device.

18. The system as in claim 11, wherein the mobile communication device is camped on the first wireless network when the mobile communication device receives the message over the first wireless network.

19. The system as in claim 11, wherein no wireless communication link is established between the mobile communication device and the second wireless network at a time of the mobile communication device receiving the message over the first wireless network.

20. The system as in claim 11, wherein the mobile communication device is operable to camp on the first wireless network after terminating a wireless communication link in the second wireless network supporting the incoming voice call.

21. Computer-readable storage hardware having instructions stored thereon, the instructions, when carried out by computer processor hardware, cause the computer processor hardware to:
receive notification of an incoming voice call from a remote communication device directed to the mobile communication device;
in response to receiving the notification, communicate a message over the first wireless network to the mobile communication device, the message prompting the mobile communication device to monitor communications over a second wireless network; and notify a call management controller in the second wireless network of the incoming call directed to the mobile communication device.

\* \* \* \* \*